No. 893,111. PATENTED JULY 14, 1908.
A. E. TAYLOR, L. F. PARSONS, A. MOTT, A. TAYLOR & E. FISHER.
GATE.
APPLICATION FILED JAN. 18, 1908.
2 SHEETS—SHEET 1.
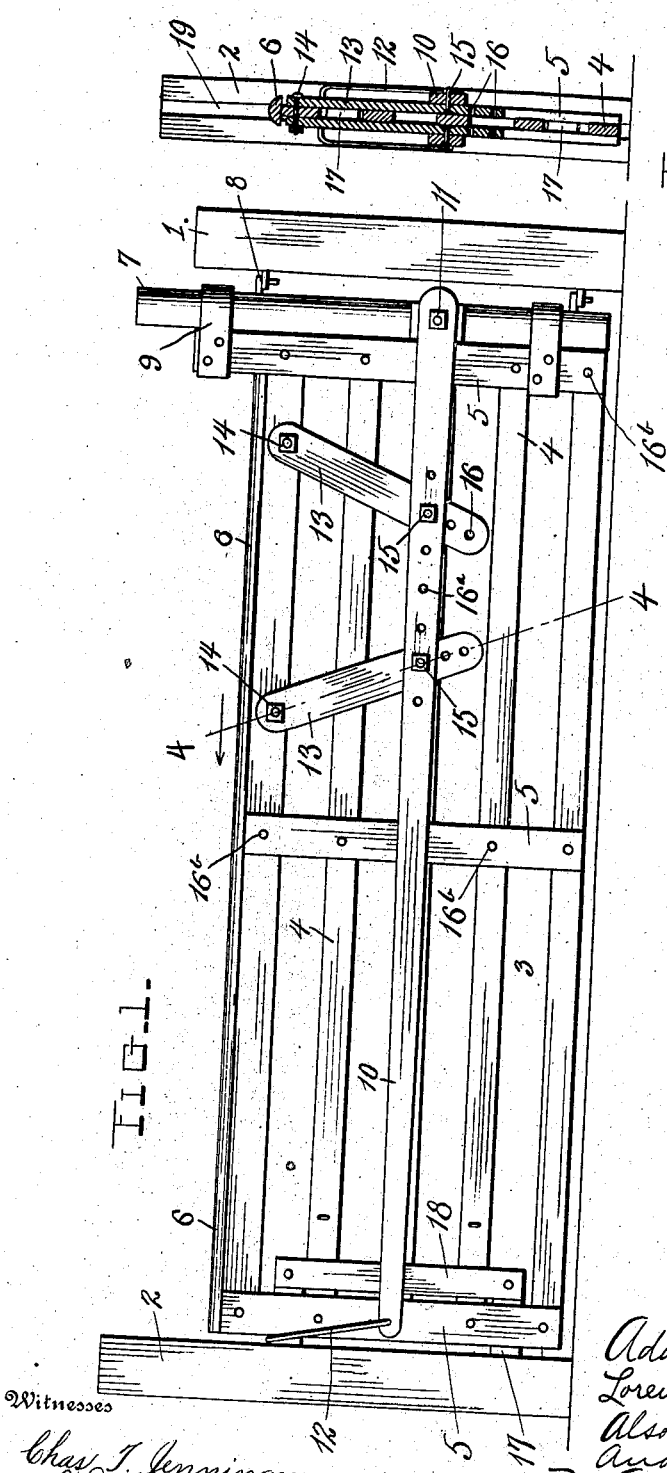
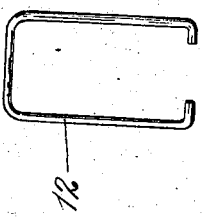

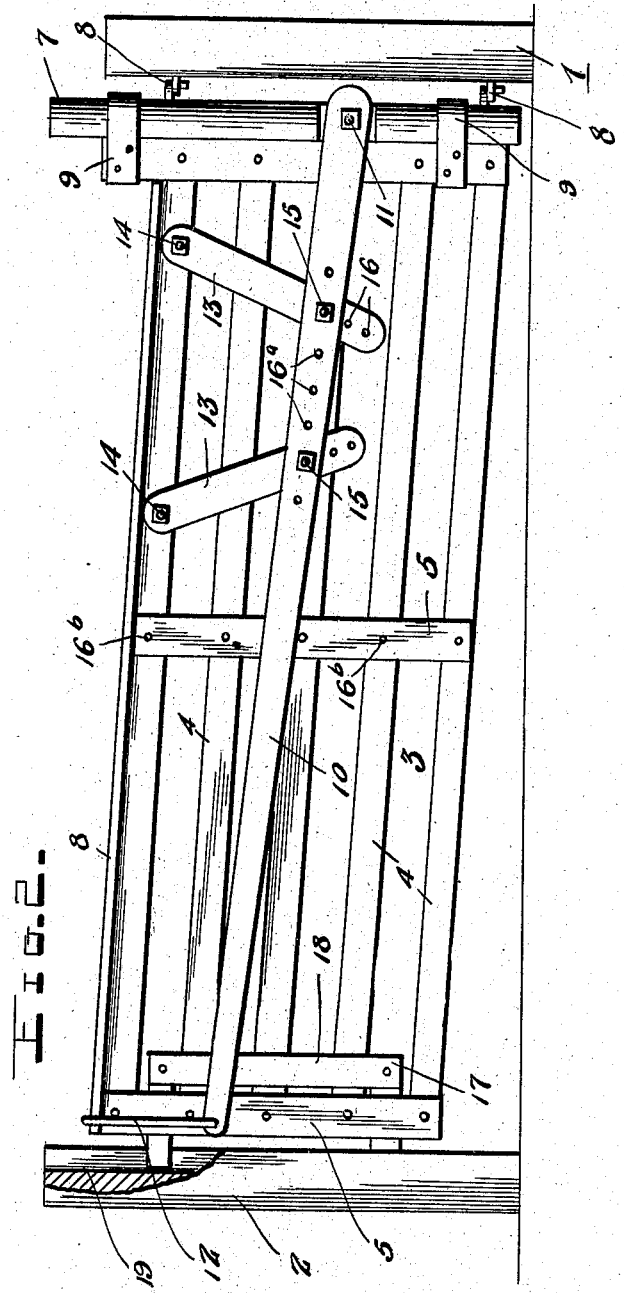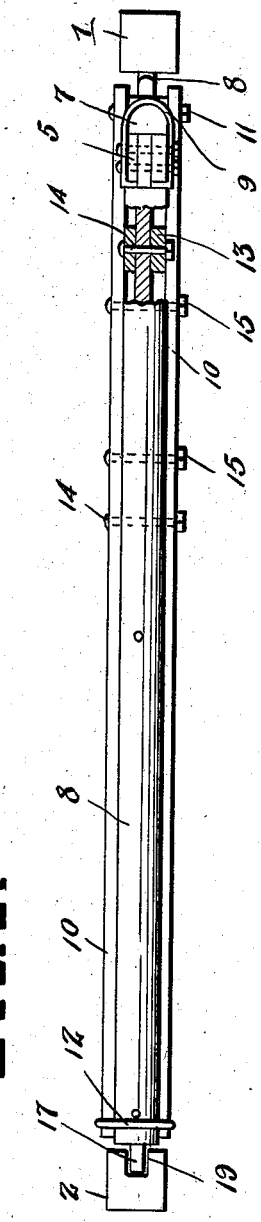

UNITED STATES PATENT OFFICE.

ADAM E. TAYLOR, LOREN F. PARSONS, ALSON MOTT, ANDREW TAYLOR, AND ELMER FISHER, OF ALBION, NEW YORK.

GATE.

No. 893,111.      Specification of Letters Patent.      Patented July 14, 1908.

Application filed January 18, 1908. Serial No. 411,502.

*To all whom it may concern:*

Be it known that we, ADAM E. TAYLOR, LOREN F. PARSONS, ALSON MOTT, ANDREW TAYLOR, and ELMER FISHER, citizens of the United States, except ANDREW TAYLOR, a citizen of the Dominion of Canada, but all residing at Albion, in the county of Orleans and State of New York, have invented certain new and useful Improvements in Gates, of which the following is a specification, reference being had to the accompanying drawings.

Our invention relates to improvements in farm gates and its object is to provide a simple and practical one which may be lifted bodily to have its bottom clear snow banks or other obstructions and to permit of the passage of small live stock under it.

With the above and other objects in view the invention consists of the novel features of construction and the combination and arrangement of parts hereinafter described and claimed and illustrated in the accompanying drawings, in which Figure 1 is a front elevation of our improved gate showing it in its lowered or normal position; Fig. 2 is a similar view showing it elevated; Fig. 3 is a top plan view partly in section; Fig. 4 is a transverse section on the plane indicated by the line 4—4 in Fig. 1; and Fig. 5 is a detail view of the U-shaped locking bail.

In the drawings 1 denotes the hinge post and 2 the latch post between which our improved gate 3 is hung for swinging movement. The body of the gate is composed of longitudinal bars or boards 4 united at their ends and at one or more intermediate points by pairs of vertical bars or slats 5 which receive the longitudinal bars between them and are bolted or otherwise secured thereto. Upon the top of the gate we preferably provide a broad cap or top piece 6 having a rounded or convex upper surface as shown in Fig. 4.

7 denotes a vertical member or bar which is connected to the post 1 by hinges 8 and upon which the inner end of the gate is vertically slidable by means of substantially U-shaped brackets 9 which surround the bar 7 and have the ends of their arms bent around and bolted or otherwise secured to the pair or set of vertical bars 5 at the inner end of the gate.

The gate body is adapted to be raised bodily in a vertical plane and held elevated by a pair of suspension members or levers 10 in the form of longitudinal bars, one of which is arranged upon each side of the gate adjacent to its center. These bars or levers have their inner ends pivoted by a common bolt or pivot 11 which passes transversely through the vertical bar or member 7 and their free outer ends are connected by a swinging U-shaped bail or loop 12. The intermediate portions of the suspension bars or levers 10 are connected to the top portion of the gate body adjacent to its inner end by pairs of substantially vertical links 13. The links of each pair are arranged upon the opposite sides of the longitudinal bars 4 and are pivoted to the uppermost one of the latter by a common bolt 14. The lower ends of the links 13 of each pair are pivoted by bolts or the like 15 upon the inner faces of the bars or levers 10 so that when the free ends of the latter are lifted the gate will be bodily raised and the straps or brackets 9 will slide upwardly upon the bar or member 7. By swinging the loop or bail 12 over upon the top edge of the gate the latter will be retained in its elevated position as shown in Fig. 2 in which position, it will be noted, the bottom of the gate is raised a sufficient distance above the ground to permit the gate to clear ordinary snow banks and other obstructions and to permit of the passage of small live stock, such as pigs and sheep, beneath the bottom of the gate. If desired, we may lengthen the lower ends of the links 13 and form in them longitudinal series of apertures 16 for the reception of the pivot bolt 15 so that the length of said links may be varied for the purpose of enabling the gate to be raised to a greater or less extent.

If desired, the levers 10 may be formed with longitudinal series of apertures $16^a$ in any of which may be inserted the pivot bolts 15 so that either end of the gate may be adjusted higher than the other end, it being noted that the bolts $16^b$ which connect the longitudinal bars 4 and the vertical bars 5 of the body of the gate serve as pivots so that said bars have relative pivotal movement to enable the gate to be tilted from a horizontal without disturbing the parallelism of the bars. While in the drawings we have shown the links 13 with their lower ends disposed some distance apart so that the latch end of the gate will move upwardly a greater extent than the hinge end when the levers 10 are raised to lift the gate, it will be understood that by positioning said lower ends of the links close together both links will be elevated substantially the same distance when the levers 10 are lifted, and, consequently, the gate when raised will be substantially horizontal or parallel with the ground. When the locking bar 12 is slipped off of the top piece 6 of the gate, the latter will drop by gravity to its normal position shown in Fig. 1.

Any suitable latching device may be provided for the free end of the gate but we preferably employ the one shown which consists of two bolt members 17 arranged between the vertical bars or slats 5 at the outer end of the gate and pivotally connected to a pair of upright connecting bars 18 arranged upon the opposite faces of the longitudinal bars 4, which latter they frictionally engage for the purpose of retaining the bolts in either their projected or retracted position. When projected said bolts or bolt members 17 are adapted to enter a vertical keeper groove 19 formed in the inner face of the latch post 2 as shown. This groove extends continuously from top to bottom of the post so that one of the bolts will be sure to enter it when the gate is elevated. It will be noted that owing to the pivotal connection of the bolts 17 with their connecting bars or members 18 that either of the bolts may be projected while the other is retracted.

Having thus described our invention what we claim and desire to secure by Letters Patent is:

1. In a gate, the combination of a support, a vertical member hinged thereto, a gate body having its inner end slidably mounted on said member, levers arranged on opposite sides of the gate and pivotally connected at their inner ends to said member, a bail or loop uniting the free ends of said levers and adapted to take over the top of the gate and links arranged in pairs on opposite sides of the gate body and pivoted to the latter and to said levers.

2. In a gate, the combination of a support, a vertical member hinged thereto, a gate body having its inner end mounted for sliding movement upon said member and consisting of longitudinal and transverse bars connected by pivots, a lever pivoted to said member, a pair of links adjustably uniting the lever and gate body and means at the free end of the lever for engagement with the gate body to hold the latter in an elevated position.

3. In a gate, the combination of a support, a vertical member hinged thereto, a gate body having its inner end mounted for sliding movement upon said member and consisting of longitudinal and transverse bars connected by pivots, a lever pivoted to said member, a pair of links, each having one end pivoted to the gate body and its other end formed with a longitudinal series of apertures, pivots passed through the lever and through certain of the apertures in said links to adjustably connect the latter to the lever and means at the free end of the lever for engagement with the gate body to hold the latter in an elevated position.

4. In a gate, the combination of a support, a vertical member hinged thereto, a gate body consisting of longitudinal and transverse bars connected by pivots, a lever pivoted at one end to the hinged member and formed with a longitudinal series of apertures, a pair of links pivoted at one end to the gate body, pivots carried by the other ends of said links and engaged with the apertures in said lever and a locking member at the free end of the lever for engagement with the gate body, substantially as and for the purpose set forth.

In testimony whereof we hereunto affix our signatures in the presence of two witnesses.

ADAM E. TAYLOR.
    LOREN F. PARSONS.
    ALSON MOTT.
    ANDREW TAYLOR.
    ELMER FISHER.

Witnesses:
    FREDERIC M. THOMPSON,
    WARNER THOMPSON.